April 21, 1953  A. M. MAYO ET AL  2,635,900
PRESSURE-TIGHT TUBE JOINT
Filed Nov. 30, 1948
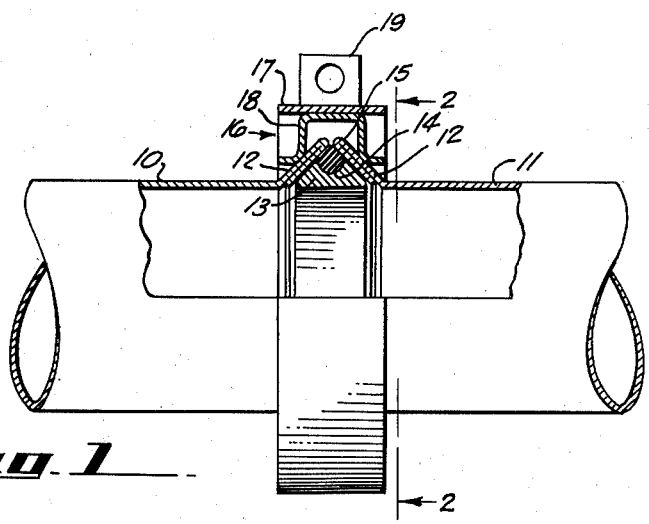
Fig. 1
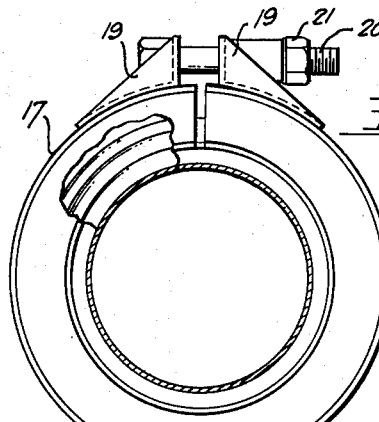
Fig. 2
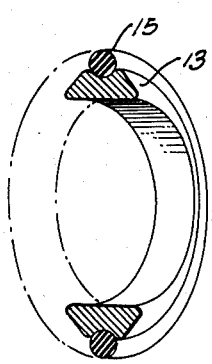
Fig. 3
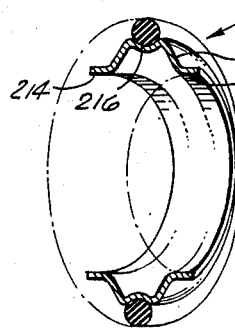
Fig. 4
Fig. 5
INVENTORS
ALFRED M. MAYO AND
HAROLD L. WALPOLE
BY Edwin Coates
ATTORNEY.

UNITED STATES PATENT OFFICE 2,635,900

PRESSURE-TIGHT TUBE JOINT

Alfred M. Mayo, Los Angeles, and Harold L. Walpole, Culver City, Calif., assignors to Douglas Aircraft Company, Inc., Santa Monica, Calif.

Application November 30, 1948, Serial No. 62,624

1 Claim. (Cl. 285—59)

This invention relates to conduit jointures and especially those for coupling thin-walled conduits, which can not satisfactorily be coupled by employment of threaded means.

Although non-threaded couplings for this purpose have been hitherto proposed, they are not satisfactory for use in aircraft and the like environments where they are subjected to considerable external stresses, as well as to ultra high internal pressures and to high temperatures. These influences usually cause rupture or displacement of the components of the jointure, or, in some cases, the dissolution of the packing members, with consequent failure and leaking of the jointure. Moreover to render such joints even partially fluid-tight, it has been deemed necessary heretofore to employ machined ring-flanges welded to the adjacent duct ends and clamped together over an O-ring or the like carried between the machined rings in establishing the jointure, and to incorporate a number of other complex and weighty components. Such configurations not only render it difficult to maintain the joint fluid tight but are time-wasting and onerous to assemble and impose a serious weight penalty out of proportion to the efficacy of the construction.

The present invention provides a threadless coupling for thin-walled conduit sections which is especially well adapted for fluid tightly sealing the joint against high pressure, high temperature media conveyed by the conduits. Comprising essentially a mounting ring disposed between the coaxial conduit sections concentrically thereof and carrying a sealing element on its outer periphery, an annular flange flared outwardly on each of the adjacent ends of the conduits and overlying the sealing element, and a conventional annular V-clamp surrounding the flanges and clamping them against the sealing member and its supporting ring, the jointure itself obviously includes but two movable parts and involves no welding or welded components. Although the joint is hence much lighter and easier to make and assemble than previous such articles, it is nonetheless more nearly absolutely fluid tight, more stable and more rigid than such previous jointures. Because the sealing member is easily accessible for replacement, the article is of widespread utility, being quickly and easily convertible from high pressure, low temperature service to high or low pressure, high temperature service by merely substituting a sealing O-ring or the like of an appropriate composition for the original sealing ring.

The other objects and advantages of the invention will be made manifest as this disclosure proceeds.

The concepts just set forth may be embodied in any number of structural forms and configurations without departing from the scope of the invention, but by way of example and clarification, several of the present preferred embodiments of these concepts are illustrated in the accompanying drawings and will be described hereinafter in conjunction therewith.

In these drawings,

Figure 1 is a view, partly in side elevation, partly in section and partly fragmentary, of one of the presently preferred forms of the jointure;

Figure 2 is a side elevational view taken on line 2—2 of Figure 1, a portion of the jointure being broken away to illustrate the internal construction;

Figure 3 is a perspective of the sealing unit of the jointure;

Figure 4 is a fragmentary sectional view of another of the presently-preferred forms of the jointure; and Figure 5 is a perspective view of a further modified form of the sealing unit of the jointure.

The illustrated structure essentially comprises a pair of conduits 10 and 11 of the thin-walled, light, type employed in aircraft for conducting fluid media, principally compressed air or other high pressure fluid, from one location of the craft to another in straight paths as well as around sharp bends, in convolutions etc. Because of the nature of the tubing and the thinness of its walls, it is impracticable to join the lengths of tubing by screw-threaded union means and it is hence necessary to employ some other type of jointure which will be fluid tight under all pressures and temperatures and withstand stresses imparted to the joint by the operating loads arising in the airplane.

To this end, the present jointure includes machine-bent, outwardly flared, flanges 12, one at each of the adjacent ends of the tubing, the angularity of the flares being of the order of 45° preferably. A mounting and force directing ring 13, which is either wedge-shaped or truncated triangular, or rhomboidal in cross section and having an inner diameter approximating that of the inner diameter of the pipes and having an outer diameter somewhat less than that of the flared portions of the pipes, is positioned between the pipe ends concentrically thereof and inwardly of the flares, being aligned axially with the remainder of the jointure. An annular seat 14 is provided in the outer face of the mounting ring 13, the seat having a depth somewhat less than a sealing member 15 mounted therein. Preferably, the sealing members consist of an elastically deformable O-ring, but, as hereinafter explained, may take any suitable form and composition.

A "V-type" clamping ring 16 is mounted around the exterior of the joint coaxially with the conduits for the purpose of applying circumferential tension to the outer faces of the flanges. The clamp comprises, in the more or less conventional manner, a thin, circumferentially divided outer ring 17 bearing on its inner face an inwardly facing channel or hat section resilient member 18, also circumferentially divided. The split ring 17 is adapted to be drawn together circumferentially in its divided portion to exert its tension upon the member 18, by means of tensioning ears 19 projecting radially therefrom and bearing a tensioning bolt 20 provided with a nut 21 adapted to be reached on the bolt to decrease the diameter of the clamp ring.

The pipe-joint may be established by first positioning the ring 13 in a stationary manner against one of the flares and then abutting the other flare on the opposite side of its triangular portion. For service with compressed air pressures of the order of 40 to 400 p. s. i. and reaching a temperature of 500° F., it has been found that rubber or neoprene compositions are not suitable for the sealing ring 15. Some of the better materials for use under these conditions are the silicones, which are polymeric products of silicon, oxygen, and hydrogen in tough, heat resisting, plastic form. Such rings are, of course, interchangeable with rings of different composition and cross-section. In any event, after thus assembling the major components of the jointure, they are forced into sealed, fluid-tight condition by application and operation of the tensioning ring 16 in the proper manner to apply a constrictive force around the periphery of the joint. Upon tensioning the clamping ring the contractive force is applied to the flares by the contacting edges of the channel section 18 and the angular relation of the parts produces a longitudinally acting pair of equal and opposite forces which draw the flared ends together lengthwise of the joint and against the angular faces of mounting ring 13 and the upper periphery of the Silicone ring. If the clamping ring is constricted sufficiently and the flanges are long enough, the tightening of the clamp will also force the opposite edges of the flanges into abutment.

There is thus no possibility of the compressed fluid escaping in any direction since outward radial escape of the fluid is prevented by the contact of the O-ring and flares aided by the contact of the angular faces of mounting ring 13 with the inner faces of the flares.

If the temperature of the conducted fluid should rise to such a degree as to cause melting of the thermoplastic O-ring, the fluid O-ring composition will merely flow into the channel section 18, if the flanges are not in fluid-tight longitudinal abutment, but will not flow between the mounting ring and the flares.

It is obvious that only two parts require manipulation in assembling or disassembling the joint which can thus be made substantially permanently fluid tight with a minimum of operations. It will be noted that each of the parts except the mounting ring 13 is made of sheet material and hence is of extremely light cross-sectional conformation. The parts are hence of a high strength-weight ratio. The parts being relatively few in number, the consequence is that the jointure, although substantially perfectly fluid tight and strong is so much lighter than the prevalent jointures that it is eminently well adapted for aircraft service.

By virtue of the flared flanges, doubled to provide rigidity in the joint, and the cooperation of the triangular mounting ring with the flared tube ends, which cooperation is forcibly set up by the clamping ring as the sole means necessary to establish fluid tightness, no welding is required in any location of the jointure, thus minimizing the weight thereof and avoiding the inaccuracy of alignment of welded parts, thereby adapting it quite desirably to aircraft duty.

In Figure 4 is shown a modification of the configuration just described which is particularly well adapted for ultra high pressure and temperature duty while involving only one more essential part. The principal differentiation of this configuration consists in the employment of two sealing rings 22, one to engage with each tube flange, the outer faces of the triangular member 113 each being provided with an annular seat 23 in which a ring 22 is mounted. In other respects the jointure is shaped and configured as in the preceding embodiment and functions in essentially the same manner; that is to say, tensioning the clamping ring results in drawing the tube flares longitudinally together against the adjacent sealing ring, each of which exerts its entire reactive power in establishing sealing contact with its adjacent flare, thereby increasing the force with which the seal is established and insuring still better fluid tightness.

Figure 4 includes a modification of the cross-sectional shape of the mounting ring which can be applied with equal facility to the mounting ring of Figures 1 to 3. The ring 113 is provided with an annular flange 114 extending toward the adjacent conduit end from each of its lower corners, the outer diameter of these flanges being approximately equal to the inner diameter of the conduits. As indicated in Figure 4 these flanges facilitate centering and aligning the conduit ends in establishing the joint.

In Figure 5 a mounting ring 213 is shown having angular side faces 215 and a single annular seat 216 at its apex, similar to the form shown in Figures 1 to 3, as well as annular flanges 214 similar to the flanges 114 of Figure 4. This ring may be stamped or otherwise formed from sheet metal or from a piece of seamless tubing. It is lighter in weight than the forms previously described and is suitable for use in installations operating in the lower ranges of pressure and rate of fluid flow. It can, of course, be formed with a pair of annular seats to correspond to the showing of Figure 4.

The particular constructional forms described hereinabove by no means constitute the only embodiments which the invention may assume, the essential configurational aspects and components of the invention being defined in the claim immediately following.

We claim:

A jointure for conduits, comprising: a pair of coaxial conduit sections arranged in endwise adjacency, each section having an outward annular flare on that end thereof which lies in the jointure; a single piece of, substantially, thin sheet-metal conformed as a hollow-walled annulus having a generally rhomboidal cross-section, the radially outermost wall of the sheet-metal annulus being inwardly sunken throughout its circumference to form a peripheral concavity; a toroidal sealing member seated in said concavity; and tightenable clamping means externally engaging said flares and constrictable so as to draw them together tightly against said flares, thereby to fluid-tightly seal said flares against said sealing member; the face of the sheet-metal annulus that lies opposite the aforesaid outermost wall thereof being open to define a relatively wide longitudinal space between the remaining two walls of the rhomboidal-section annulus, the spaced sides being sufficiently resilient to enable movement of said two walls towards each other under axial thrusts applied to the jointure, thereby to relieve the seal of the effects of such thrusts and maintain the fluid-tight integrity of the jointure.

ALFRED M. MAYO.
HAROLD L. WALPOLE.

References Cited in the file of this patent

UNITED STATES PATENTS

| Number | Name | Date |
|---|---|---|
| 1,561,033 | Spencer | Nov. 10, 1925 |
| 1,782,484 | Spencer et al. | Nov. 25, 1930 |
| 2,014,313 | Damsel | Sept. 10, 1935 |
| 2,219,161 | Jacobs | Oct. 22, 1940 |

FOREIGN PATENTS

| Number | Country | Date |
|---|---|---|
| 206,131 | Great Britain | Apr. 10, 1924 |
| 444,939 | Great Britain | Mar. 31, 1936 |